H. E. DOEBLER.
DEMOUNTABLE WHEEL RIM.
APPLICATION FILED MAY 12, 1915.
1,197,719.
Patented Sept. 12, 1916.
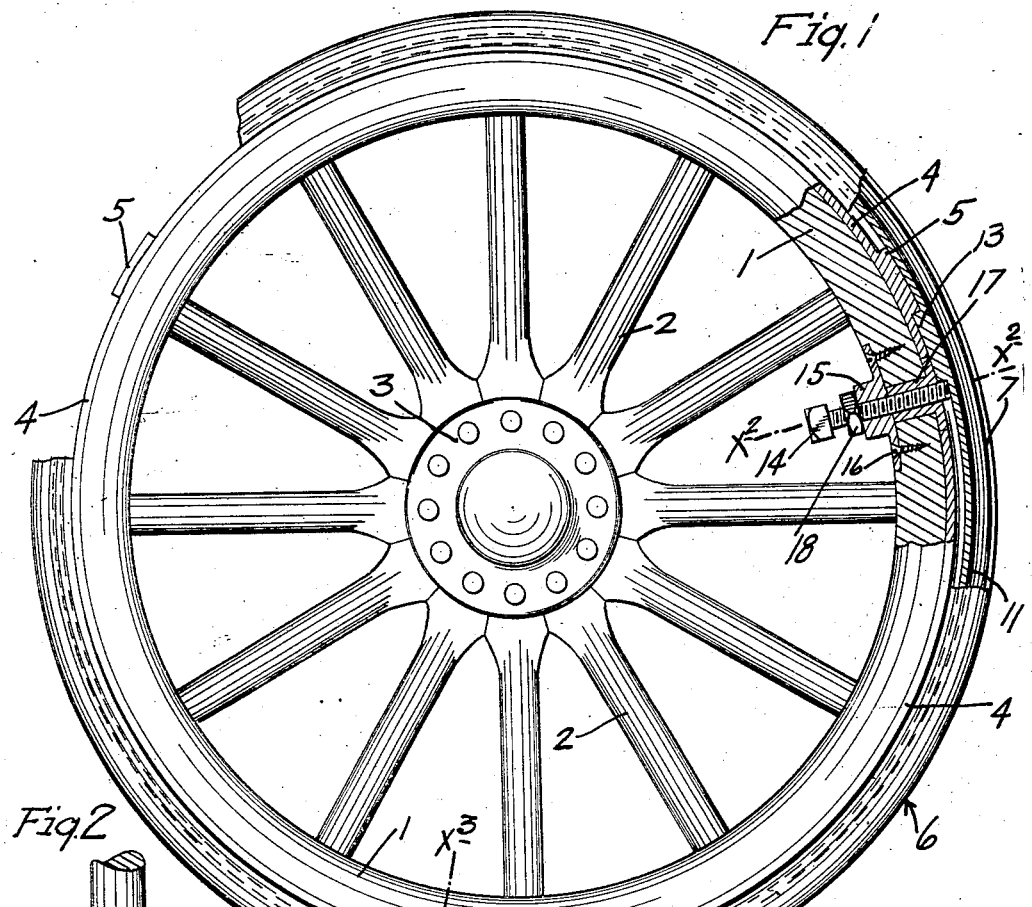
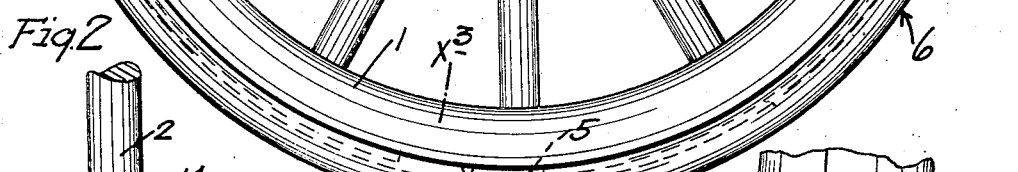
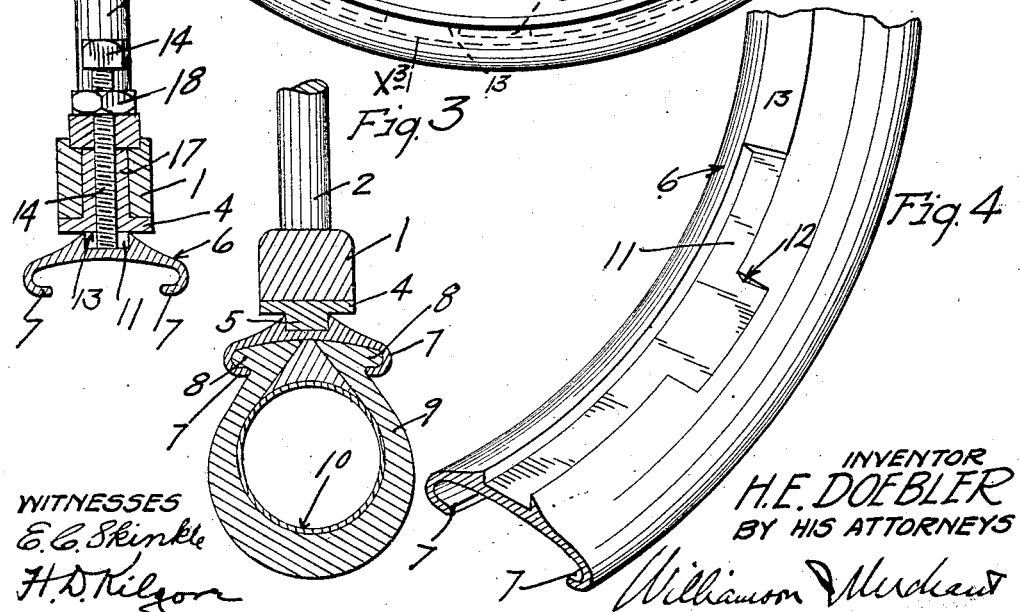
WITNESSES
E. C. Skinkle
H. D. Kilgore
INVENTOR
H. E. DOEBLER
BY HIS ATTORNEYS
Williamson & Merchant

UNITED STATES PATENT OFFICE.

HENRY E. DOEBLER, OF CANNON FALLS, MINNESOTA.

DEMOUNTABLE WHEEL-RIM.

1,197,719.

Specification of Letters Patent. Patented Sept. 12, 1916.

Application filed May 12, 1915. Serial No. 27,557.

*To all whom it may concern:*

Be it known that I, HENRY E. DOEBLER, a citizen of the United States, residing at Cannon Falls, in the county of Goodhue and State of Minnesota, have invented certain new and useful Improvements in Demountable Wheel-Rims; and I do hereby declare the following to be a full, clear, and exact description of the invention, such as will enable others skilled in the art to which it appertains to make and use the same.

My invention relates to improvements in demountable wheel rims; and, to this end, it consists of the novel devices and combinations of devices hereinafter described and defined in the claim.

In the accompanying drawings, which illustrate the invention, like characters indicate like parts throughout the several views.

Referring to the drawings, Figure 1 is a side elevation of an automobile wheel having the invention applied thereto; Fig. 2 is a transverse section taken on the line $x^2$ $x^2$ of Fig. 1 on an enlarged scale; Fig. 3 is a transverse section taken on the line $x^3$ $x^3$ of Fig. 1 on an enlarged scale; and, also, showing applied to the demountable rim a tire casing within which is mounted a pneumatic tube; and, Fig. 4 is a fragmentary perspective view of the demountable wheel rim on an enlarged scale.

The numerals 1, 2 and 3 indicate respectively the wooden felly, the spokes and the hub of an automobile wheel, which may be of the standard or any desired construction.

Permanently secured on the wooden felly 1, usually by shrinking, is a felly band 4 having integrally formed therewith a plurality of circumferentially spaced lock lugs 5, as shown three. A demountable wheel rim 6 is applied to the felly band 4 and its edges are rolled outward and inward to form clencher flanges 7, adapted to receive and hold the clencher beads 8 of a tire casing 9. Within the casing 9 is mounted the customary pneumatic inner tube 10.

On the inner face of the demountable wheel rim 6 is circumferentially extended channel 11, having in one of its sides a plurality of circumferentially spaced entrance passages 12, as shown three. The lock lugs 5 are arranged to be inserted into the channel 11, through the entrance passages 12, by a lateral movement of the demountable wheel rim 6 with respect to the felly band 4. Then by a circumferential movement of the demountable wheel rim 6 on the felly band 4, the lock lugs 5 may be moved out of alinement with the entrance passages 12, thereby securely holding said rim against lateral movement on the felly band 4. Within the channel 11 is formed a plurality of circumferentially spaced lock lugs 13 that are also circumferentially spaced with respect to the entrance passages 12, as best shown in Fig. 4. The number of lock lugs 13 correspond to the number of lock lugs 5, and the circumferentially spacing of the two series is the same, so that the lock lugs 5 directly engage the lock lugs 13 in the direction of the forward rotation of the wheel.

To hold the lock lugs 5 in contact with the lock lugs 13 and against movement in the direction of the backward rotation of the wheel, there is provided a set screw 14. This set screw 14 is circumferentially spaced from one of the lock lugs 5, a distance sufficient to project back of the lock lug 13 in engagement with the respective lock lug 5. The set screw 14 has screw-threaded engagement with a flange nut 15 permanently secured to the felly 1 by screws 16 passed through the flange of said nut and into the felly 1. This set screw 14 also has screw-threaded engagement with a flanged sleeve set into the bottom of the channel 11 and into the felly 1. The inner end of the set screw 14 is arranged to be projected into the channel 11 through the bottom thereof. Obviously, by turning the set screw 14 in the proper direction, the inner end thereof may be withdrawn from the channel 11, so that the lugs 13 may be moved circumferentially in the channel 11, to and from operative positions. A lock nut 18 on the set screw 14 is provided for holding the same against accidental rotation.

From the foregoing description, it is evident that the above described demountable wheel rim may be very quickly and easily applied to the felly band, or removed therefrom. The invention is also, extremely simple, of comparatively small cost to manufacture, and with few parts to get out of adjustment.

What I claim is:

The combination with a demountable wheel rim having a circumferential channel with a plurality of lateral entrance passages, and a plurality of rigid lock lugs in said channel, circumferentially spaced with respect to said entrance passages, of a felly band having a plurality of circumferentially spaced rigid lock lugs adapted to be inserted into said channel through its entrance passages and to be moved through said channel into engagement with the lock lugs therein, and a set screw mounted in said felly band, circumferentially spaced with respect to one of the lock lugs thereon and arranged to be projected into said channel, back of one of the lock lugs on the demountable rim to hold the lock lugs on said demountable rim in engagement with the lock lugs on the felly band, the inner end of said set screw being engageable with the bottom of the channel in said demountable rim, and having a lock nut by means of which it may be locked in such engagement.

In testimony whereof I affix my signature in presence of two witnesses.

HENRY E. DOEBLER.

Witnesses:
 SAMUEL KROFT,
 BERNARD F. GRETZ.

Copies of this patent may be obtained for five cents each, by addressing the "Commissioner of Patents, Washington, D. C."